3,061,403
METHOD OF PURIFYING MONATOMIC
INERT GASES
John J. Rendos, Millington, N.J., assignor to Air Reduction Company, Incorporated, New York, N.Y., a corporation of New York
Filed May 25, 1959, Ser. No. 815,581
11 Claims. (Cl. 23—2)

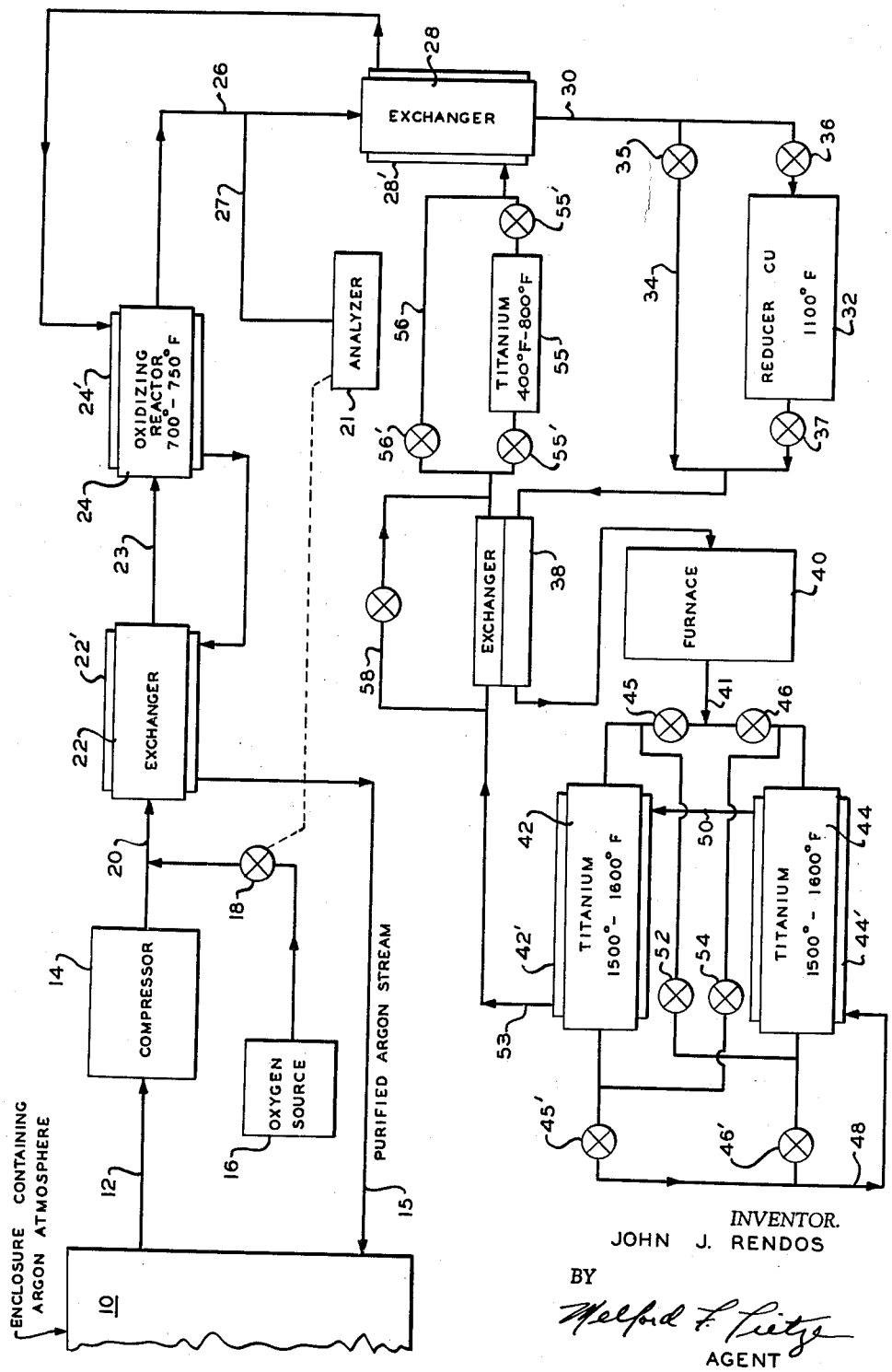

This invention relates to the purification of monatomic inert gases and particularly to the purification of such gases contaminated with constituents of atmospheric air, especially nitrogen, and hydrocarbon vapors.

The monatomic inert gases to which the present invention pertains include argon, helium, neon, krypton and xenon. There has been a rapidly growing need for such gases in connection with various chemical and metallurgical processes as well as in the electronic field. The uses of these materials require an especially high degree of purity of such gases and there has been a growing need for an efficient and reliable means for producing such gases, of high purity, in substantial quantities.

Accordingly, it is an object of the present invention to provide a simple, efficient and reliable method for purifying monatomic inert gases.

One area of need for simple and effective methods of purifying inert gases has resulted from advancements in the art of metallurgy. In the production and fabrication of certain high alloy metals, especially, for example, the metalworking of heated billets, including rolling, uninterrupted blanketing with protective inert gas atmospheres is required to avoid detrimental effects. It is readily apparent that the difficulties of providing effective blanketing for metalworking operations are numerous, particularly where these metals are to be handled on other than a small, laboratory scale basis. One solution that has been devised is to carry out such operations in a room or large enclosure in which the atmospheric air has been completely replaced by the necessary blanketing gas. In such an operation, any personnel required for carrying out the process are clothed in sealed suits to which the necessary oxygen for breathing is supplied. It is inherent, however, that some contamination of the inert atmosphere by atmospheric gases will occur. Thus, for example, the movement of persons or material to and from the enclosure, even with protective measures, causes some influx of atmospheric contaminants. A further source of contaminants is the machinery and equipment housed in the processing enclosure, in which the lubricants, used in bearings and other movable parts, tend to yield vapors, particularly hydrocarbons. There may also be other contaminant substances in relatively small amounts present in the inert gas for the protective atmosphere.

Accordingly, a further object of the invention is to provide a purification method particularly adapted for the efficient removal from such monatomic inert gases of contaminants including constituents of atmospheric air and hydrocarbons.

A further object of the invention is to provide a simple and reliable method of purification for such gases, utilizing a gettering agent that is highly selective for removal of undesired contaminants.

A further object of the invention is to provide such a method utilizing a gettering material that is substantially stable in oxidizing atmospheres and capable of continuous operation at elevated temperatures without combustion or the occurrence of rapid decomposition.

It is a further object of the present invention to provide such a method of purification for such gases wherein the hydrocarbon contaminants, normally unaffected by the gettering agent, are oxidized and the resulting gas, including the oxidation products therefrom, effectively purified to an extremely high degree of purity by contact with a gettering agent.

It is a further object of the present invention to provide a method of purification for monatomic inert gases containing nitrogen as the principal contaminating substance together with minor contaminating amounts of hydrocrabons and one or more of the contaminants selected from the group consisting of CO, $CO_2$, $O_2$ and $H_2$ wherein the oxidizable contaminants are oxidized in the presence of an oxidizing agent and the resulting oxidized gas stream contacted at an elevated temperature, with an effective gettering agent, and a substantially pure resultant gas obtained therefrom.

It is a still further object of the present invention to provide a system for maintaining a desired degree of purity of a monatomic inert gas in an enclosure wherein the inert gas atmosphere containing contaminating atmospheric gases and hydrocarbons is continuously cycled through a purification circuit, including a selective gettering agent, to affect the substantially complete removal of the contaminating substances and the thus treated stream returned to the enclosure in a relatively pure state.

In accordance with the present invention, a method of purifying a monatomic inert gas contaminated with constituents of the air and oxidizable impurities including hydrocarbons comprises continuously oxidizing the hydrocarbons and other oxidizable constituents in a stream of the contaminated gas and thereafter separating the oxidation products and remaining contaminants from the inert gas by contacting said gas stream with a bed of titanium at an elevated temperature. Advantageously, the oxidation is carried out with a slight excess of oxygen and a required amount of oxygen may be added to the oxygen stream for this purpose and suitably controlled by analysis of the resulting gas stream such that a slight excess of oxygen is maintained therein.

The atmospheric contaminant and the principal contaminant with which the present invention may be advantageously employed is nitrogen. However, "atmospheric contaminants" will be understood also to include oxygen and carbon dioxide although these impurities are generally present in relatively minor proportions. The invention may also be used advantageously for the purification of monatomic inert gases including as oxidizable constituents, in addition to hydrocarbons, relatively minor amounts of carbon monoxide and hydrogen.

The titanium has been found to be highly effective for the removal of the nitrogen impurity together with the oxidation products of the hydrocarbons and the other above-mentioned contaminating substances. While the titanium is effective as a getter for oxygen contained in the monatomic gas to be purified, the capacity of the titanium is further depleted to the extent of the oxygen content. Accordingly, in an alternative embodiment, the oxidized gas stream prior to passage through the titanium bed may advantageously be passed through a suitable reducer to remove excess oxygen or reduce the excess to a very slight amount. This may be accomplished in a suitable fashion by passing the process stream over a bed of heated copper. Such alternative procedure has the advantage that the copper oxide formed thereby may be readily reduced for further use, and minimize the necessary replenishment of the titanium getter.

The oxidation of the hydrocarbon constituents and any other oxidizable contaminant substances may be carried out advantageously by contacting the mixture together with a slight excess of oxygen with an oxidation catalyst such, for example, as Type F De-oxo catalyst. Type F De-oxo is a trade name for a finely divided precious metal oxidation catalyst which is furnished as a dispersion on a suitable refractory support. Various well known oxidation catalysts are suitable for purposes of the present invention including, for example, precious metals such as platinum and palladium and the oxides of metals such as iron, vanadium and nickel. Alternately, the method may be carried out advantageously by the use of oxidizing agents such as copper oxide or manganese dioxide. With these materials, it is not necessary to furnish additional oxygen and the oxidation is accomplished by the reduction of the oxidizing agent. The oxidation reaction is preferably carried out at elevated temperatures of from 300° F.–800° F. and preferably not above 900° F. In carrying out the invention by the use of a Baker De-oxo F catalyst, temperatures of from 700° F. to 750° F. are advantageous.

While the method according to the present invention may be used to advantage for the treatment of monatomic inert gases at substantially any level of concentration of the contaminants, the invention is most advantageous and is preferred for use when the inert gas contains relatively small concentrations of the impurities such, for example, in the range of 500 p.p.m. or less. It will be understood that there has heretofore been no completely satisfactory method, particularly for maintaining a very high purity atmosphere in a relatively large enclosure involving the circulation and treatment of large volumes of inert gas. Consequently, it is significant that the present invention affords a simple and efficient process that is especially suitable for the removal of extremely small, or trace, amounts of impurities from such gases. Thus, for example, the present invention has been used to great advantage in the treatment of monatomic inert gases such, for example, as argon containing in the order of about 250 p.p.m. total impurities and reducing the concentration of such impurities to substantially about 2 p.p.m. or less.

The method is especially advantageous at low levels of contamination since it is sensitive to trace amounts and can affect their removal. However, the titanium getter cannot ordinarily be regenerated and its sorptive capacity is rapidly depleted at relatively high impurity concentrations. Since the getter must then be replaced at correspondingly more frequent intervals, an increased operating cost is incurred although, of course, the method is still advantageous, even at such relatively high concentrations, in its selectivity and ability to produce a highly purified product.

The titanium getter is advantageously employed in a porous state commonly referred to as sponge titanium and is further desirably used in granulated form disposed as a porous bed of the material to afford contact of the gases undergoing treatment by passage of the gases therethrough and further enabling a relatively large ratio of surface contact area to the volume of the gettering material. The gases are contacted with the titanium getter advantageously at elevated temperatures in the range of 1500° F.–1600° F.

Using the data and a contaminant level such as referred to above, the purification may be effectively obtained of 88,200 s.c.f. or argon having a contaminant level of 212 p.p.m. or 18.52 s.c.f. equivalent of nitrogen utilizing 4.63 lbs. of titanium getter.

The oxidation of the oxidizable contaminants in the process stream, including the hydrocarbon impurities, produces carbon dioxide and water vapor which are subsequently effectively removed together with the other contaminants by contact with the titanium getter. It is possible that concentrations of hydrocarbons and other oxidizables may be encountered at which the correspondingly increased amounts of water vapor, which are decomposed in the presence of the getter, will produce residual hydrogen in the treated process stream in excess of that which may be tolerable or desired in the purified stream. Such residual hydrogen may be more effectively removed by further contacting the process stream with a body of the titanium getter at a relatively lower range of temperatures such, for example, as in the range of 400° F.–800° F. Substantially the same amount of the additional getter may be advantageously used for such purpose as in the case of the titanium provided for the removal of the contaminants as above-described.

In order to accomplish the purification method, suitable means, such as a furnace, is provided to heat the oxidized process stream to the desired temperature for contact with the titanium gettering material and to maintain the various steps of the process at their desired elevated temperature levels. For cycle efficiency, the process gas stream, preparatory to contact with the gettering material, may be advantageously passed in heat exchange with the heated purified stream to maintain the desired temperature levels at the various stages of the process. By desired heat exchange arrangement, the purified process stream is progressively cooled through the successive heat exchange steps and the stream of contaminant gas to be treated is progressively heated and maintained at the desired temperature range for the successive steps of the process.

The invention and other of its objects and advantages may be more fully understood by reference to the following description of a preferred embodiment thereof taken in connection with the accompanying drawing in which the drawing is a schematic diagram showing a gas purification system in accordance with a preferred embodiment of the present invention through which contaminated monatomic inert gases from a confined chamber are circulated to maintain a desired level of purity of the gases within the enclosure.

Referring to the drawing, the numeral 10 designates a closed chamber such as a room within which it is desired to maintain at a high purity an atmosphere of a monatomic inert gas such as argon. The chamber 10 may be an enclosure of relatively large size within which a chemical process or metallurgical fabrication is carried out under the protective atmosphere provided by the monatomic inert gas. Due to diffusion of atmospheric gases into the enclosure, the evolution of gaseous hydrocarbons from lubricants or other sources associated with the operations in the enclosure as well as other effects, the protective atmosphere tends to accumulate nitrogen and the other contaminating vapors to a level which may be unsuitable due to adverse effects upon the operations being performed within the enclosure. To illustrate a method carried out in accordance with the present invention, a typical contaminated monatomic inert gas atmosphere is argon containing a total of 250 p.p.m. (parts per million) impurities which may be in the proportions: Nitrogen, 150 p.p.m.; oxygen, 37 p.p.m.; $H_2O$ vapor, 25 p.p.m.; and the remainder, including $H_2$, $CO_2$, CO and hydrocarbons, 38 p.p.m. The contamined argon atmosphere is withdrawn as shown at 12 by the suction of a compressor 14 whose delivery pressure is merely sufficient to overcome the flow resistance of the succeeding purification steps and to maintain a desired flow rate through the purification cycle. Following the circulation of the gases withdrawn at 12 through the purification cycle as hereinafter described, the argon in a relatively pure state is returned at 15 to the enclosure 10. By continuously circulating argon in this manner and removing the impurities contained therein, a relatively high purity of the argon atmosphere within the enclosure may be maintained. In the present embodiment, a circulation of substantially 600 s.c.f.m. of the argon, which is purified to substantially about 2 p.p.m. or less impurity, is sufficient to accomplish the desired result.

Oxygen from a source indicated at 16 which may be a conventional source of oxygen such as compressed gas cylinders or the like is controllably delivered through valve 18 and combined in desired proportions with the process stream at 20. The valve 18 is automatically responsive to an analyzer device 21 in order to insure the introduction into the process stream of an amount of oxygen at least sufficient to oxidize all of the oxidizable contaminants therein.

The process stream is then heated in exchanger 22 in indirect countercurrent heat exchange with the purified gas stream and thence passes through conduit 23 to an oxidizing reactor shown at 24. The reactor may be of a conventional type having a suitable oxidizing catalyst such as a De-oxo F catalyst. Oxidation of the oxidizable constituents in the argon stream is accomplished in the reactor, assisted by the oxidation catalyst. The carbon monoxide, hydrocarbons and hydrogen contaminants are converted to the corresponding oxidation products, the hydrocarbons resulting in carbon dioxide and water vapor.

The heated, oxidized argon stream is discharged from the reactor through conduit 26 with which a sample line 27 of the oxygen analyzer 21 is connected. The analyzer 21 detects a predetermined small excess of oxygen in the stream passing through conduit 26 and produces corresponding adjustments of the control valve 18 for the admixture of oxygen as above-described. Devices such as the analyzer 21 are well known and need not be described herein. It will be seen that in the absence of the predetermined slight excess of oxygen in the process stream delivered from the oxidizing reactor, the analyzer will cause the oxygen valve 18 to open so that a continuous supply of a suitable proportion of oxygen is continuously assured.

The oxidized stream passes through counterflow heat exchanger 28 in indirect heat exchange with the purified gas stream where it is further heated to a higher temperature. The heated oxidized argon stream is then delivered through conduit 30 and is alternatively conveyed through a reducing reactor shown at 32 or a bypass conduit 34. The bypass is controlled by a valve 35 and the passage of gas through the reducer is controlled by valves 36 and 37. The reducer is primarily for the purpose of removing substantial excess amounts of oxygen in the argon stream in order thereby to minimize the amount of oxygen that the titanium getter is required to take up when the process stream is subsequently contacted therewith. The reducer may be copper and is maintained at about 1100° F. to effectively remove such excess oxygen. The reducer is placed in stream by opening the valves 36 and 37. When the reducer is not desired, the valves 36 and 37 are closed and the bypass conduit valve 35 opened. The argon stream thence passes through heat exchanger 38 and is then delivered to furnace 40 wherein the stream is heated to the desired temperature for passage through the titanium getter. The furnace 40 may be of any conventional design having provision for indirectly heating the gas stream passing therethrough and may be, for example, of the type that is electrically heated for this purpose.

The outlet 41 of the furnace is connected in parallel to a pair of titanium reactors, shown at 42 and 44 respectively, through valves 45 and 46. The opposite ends of the reactors are connected through the corresponding valves 45′ and 46′ with a common conduit 48 from which the resulting purified gas stream, heated substantially to the temperature at which the absorption reaction is carried out, is then passed in series through the heat exchanger jackets 44′ and 42′ of the titanium reactors. The jacket chambers 44′ and 42′ are connected in series by the connecting conduit 50.

Valved conduits 52 and 54 connect the inlets and outlets, respectively, of the reactors 42 and 44 so that the reactors may alternatively be placed in parallel flow relation, or in series flow relation. Thus, it may be seen, by opening the valves 45, 54 and 46′ and closing valves 46, 45′ and 52, that the reactors will be placed in series with the flow first going through the reactor 42 and then through the reactor 44 to the delivery conduit 48. By reversing the settings of these valves the reactors will be placed in series flow in the opposite order. It will be readily apparent that by closing the valves 52 and 54 and opening the appropriate paired valves 45—45′ and 46—46′ that one or the other or both of the titanium reactors may be placed in service.

In practice, it may be desired at certain intervals to keep only one of the absorbers in service and to hold the other apart from the flow of the process stream while maintaining the inactive reactor substantially at operating temperature. This allows a partial regeneration of the titanium charge in the inactive reactor.

The purified gas stream from the heat exchanger jackets of the reactors is delivered through conduit 53 and conveyed through the heat exchanger 38 in indirect countercurrent heat exchange with the oxidized process stream therein. The gas passing through the exchanger 38 is then alternatively conveyed through a low temperature titanium reactor 55 or bypass conduit 56. Valves 55′ disposed at the inlet and outlet of the titanium reactor may be opened to permit the passage of the gas stream therethrough and bypass valve 56′ is provided to permit the passage of the stream through the bypass. The lower temperature titanium reactor contains a titanium getter identical to the getter contained in the high temperature reactors 42 and 44 but is maintained at a considerably lower temperature, such as 600° F. The maintenance of the desired temperature at the low temperature titanium reactor may be obtained by the valve-controlled bypass conduit 58 through which a portion of the heated gas stream in conduit 52 may be diverted around the exchanger 38 to obtain a desired stream temperature passing through the low temperature reactor. The low temperature titanium reactor may be employed as hereinabove described when an undesired level of residual hydrogen contamination may be found in the purified gas stream. In such event the further passage of the process stream through the low temperature titanium reactor will effectively remove the remaining trace amounts of hydrogen.

The resulting stream is then conducted through the jacket 28′ of the exchanger 28 and thence to the jacket 24′ of the reactor 24 and the jacket 22′ of the heat exchanger 22. The purified gas stream having thereby given off substantially all of its sensible heat and having been effectively reduced in temperature is returned at 15 to the enclosure 10.

It may be seen that, while the present method of purification of monatomic inert gases has been described specifically in connection with the maintenance of a desired level of purity of a monatomic inert gas atmosphere in a confined chamber, the purification cycle described may be employed for other purposes.

Thus, it can be seen that the present invention is not lmited to the preferred embodiment hereinabove described but may be used in other ways without departure from its spirit as defined by the following claims.

I claim:

1. The method of purifying a stream of monatomic inert gas containing atmospheric contaminants and at least one of the oxidizable impurities carbon monoxide, hydrogen and hydrocarbons, which comprises catalytically oxidizing said oxidizable impurities in a stream of said inert gas and contacting the resulting gas stream, including the products of said oxidation with titanium at an elevated temperature effective for the removal of the residual atmospheric contaminants and said oxidation products and to form a purified inert gas stream containing not more than substantially about 2 p.p.m. of said impurities.

2. The method of purifying a stream of monatomic inert gas according to claim 1, wherein said gas mixture is contacted with said titanium at a temperature of about 1500° F.–1600° F.

3. The method of purifying a stream of monatomic inert gas according to claim 2, wherein said oxidation is carried out at a temperature of about 700° F.–750° F.

4. The method according to claim 3, wherein said monatomic inert gas is argon.

5. The method of purifying a stream of monatomic inert gas containing principally nitrogen and relatively minor amounts of oxygen and hydrocarbons as contaminating impurities which comprises effecting an oxidation reaction between said oxygen impurity and said hydrocarbons and removing nitrogen and the oxidation products in the remaining gas mixture by contacting said gas mixture with titanium at a temperature of about 1500° F.

6. The method of maintaining a highly pure atmosphere of a monatomic inert gas within a confined chamber wherein nitrogen, oxygen and at least one of the oxidizable substances carbon monoxide, hydrogen and hydrocarbons, are present as contaminants in relatively minute amounts, which comprises continuously circulating a stream of said atmosphere through a purification cycle wherein said stream is first subjected to oxidation to form the oxidation products of said oxygen and said oxidizable substances, said stream is thereafter contacted with titanium at a temperature of about 1500° F.–1600° F. and the thus purified stream is thence returned to said confined chamber.

7. The method of maintaining a highly pure atmosphere according to claim 5, wherein said stream is heated by external means prior to contact with said titanium and the purified heated stream is passed in counterflow, indirect heat exchange with said cycle stream prior to said external heating.

8. The method of purifying a stream of monatomic inert gas containing atmospheric constituents and oxidizable substances including hydrocarbons as contaminating impurities, wherein said impurities are present in relatively trace amounts totaling at least more than 2 p.p.m. and not more than about 500 p.p.m., comprising catalytically oxidizing said oxidizable impurities in a stream of inert gas and contacting the resultant gas stream, including the products of said oxidation, with titanium at an elevated temperature effective for the removal of the residual impurities and said oxidation products to reduce the concentration of impurities in said stream to substantially about 2 p.p.m. or less.

9. The method of purifying a stream of monatomic inert gas containing atmospheric contaminants and at least one of the oxidizable impurities carbon monoxide, hydrogen and hydrocarbons, which comprises controllably adding to a stream of said monatomic inert gas a sufficient amount of oxygen to provide a stoichiometric excess for the oxidation of said oxidizable impurities, catalytically oxidizing said oxidizable impurities in said stream, substantially removing the residual oxygen, and contacting the resulting gas stream, including the products of said oxidation, with titanium at an elevated temperature above about 1500° F. effective to remove the residual atmospheric contaminants and said oxidation products.

10. The method of maintaining a high purity atmosphere of a monatomic inert gas within a confined chamber in which said inert gas atmosphere contains nitrogen, oxygen and at least one of the oxidizable gaseous substances carbon monoxide, hydrogen and hydrocarbons, as contaminants comprising continuously withdrawing a stream of said inert gaseous atmosphere, adding to said stream a sufficient amount of gaseous oxygen to maintain a stoichiometric excess of oxygen over that required for oxidizing said oxidizable substances, catalytically oxidizing said oxidizable gaseous substances in said stream, substantially removing the residual oxygen from said stream after said catalytic oxidation, contacting the treated stream substantially free of oxygen with titanium at an elevated temperature above about 1500° F. and returning the thus-purified stream to said confined chamber whereby the continuous circulation of said stream is effective to maintain said contaminants at a substantially negligible level of concentration within said chamber.

11. The method according to claim 9 wherein said stream, after contacting with titanium at said elevated temperature above about 1500° F., is thereafter further contacted with titanium at a temperature in the range of about 400° F. to 800° F.

References Cited in the file of this patent
UNITED STATES PATENTS

| 1,602,404 | Frazier | Oct. 12, 1926 |
| 1,658,631 | Dannenbaum | Feb. 7, 1928 |
| 2,204,501 | Krauss | June 11, 1940 |
| 2,368,060 | Wooten | Jan. 23, 1945 |

OTHER REFERENCES

Mellor: "A Comprehensive Treatise on Inorganic and Theoretical Chemistry," Longmans, Green and Co., N.Y., vol. 7, 1927, pages 18 and 19.

McQuillan et al.: "Metallurgy of the Rarer Metals-4, Titanium," Butterworth Sci. Publ., London, 1956, page 402.